United States Patent [19]

Hannah et al.

[11] Patent Number: 4,711,013
[45] Date of Patent: Dec. 8, 1987

[54] METHOD FOR REMOVING INJECTABLE MATERIAL FROM A PACKING CYLINDER

[75] Inventors: Daniel E. Hannah, Williamsville; Eugene W. Miliczky, Clarence; Clifford F. Bea, Alden; Martin J. Hannah, Williamsville, all of N.Y.

[73] Assignee: Advanced Thermal Systems, Inc., Lancaster, N.Y.

[21] Appl. No.: 4,766

[22] Filed: Jan. 8, 1987

Related U.S. Application Data

[63] Continuation of Ser. No. 719,545, Apr. 3, 1985, abandoned.

[51] Int. Cl.⁴ .............................................. B23P 7/00
[52] U.S. Cl. ............................... 29/402.02; 29/402.06; 408/1 R
[58] Field of Search ............. 29/402.02, 402.06, 564.2, 29/156.6, 156.62, 156.63; 137/315; 408/1, 14, 67, 111, 112, 137; 15/104.09, 104.1 R, 104.05

[56] References Cited

U.S. PATENT DOCUMENTS

| | | | |
|---|---|---|---|
| 875,832 | 1/1908 | Mann | 15/104.05 |
| 986,844 | 3/1911 | McCloskey | 15/104.09 X |
| 1,098,128 | 5/1914 | Schlacht | 15/104.09 |
| 1,159,977 | 11/1915 | Massey et al. | 15/104.05 |
| 1,557,588 | 10/1925 | Holtman | 15/104.05 |
| 2,115,430 | 4/1938 | Schley et al. | 408/137 X |
| 2,241,560 | 5/1941 | Schouler | 15/104.05 |
| 2,299,814 | 10/1942 | Gale | 408/137 |
| 2,380,098 | 7/1945 | Doerner | 15/104.05 |
| 3,068,724 | 12/1962 | Mueller | 408/137 X |
| 3,104,456 | 9/1963 | Powell, Jr. | 408/1 X |
| 3,229,711 | 1/1966 | Leopold, Jr. et al. | 408/1 X |
| 3,347,261 | 10/1967 | Yancey | 29/402.02 |
| 4,545,707 | 10/1985 | Bradley, Jr. et al. | 408/137 X |

FOREIGN PATENT DOCUMENTS 3138810  4/1983  Fed. Rep. of Germany ... 15/104.09

Primary Examiner—William R. Briggs
Attorney, Agent, or Firm—David C. Purdue

[57] ABSTRACT

A reamer for removing material from a packing cylinder bore of an expansion joint is disclosed. A housing is provided which consists of a hollow cylindrical body having a threaded outer surface and a threaded inner surface. The threaded outer surface of the housing is adapted to cooperate with a threaded sidewall of a cavity formed in the packing cylinder such that the housing can be selectively retained therein. A shaft assembly is provided within the hollow cylindrical body of the housing. The shaft assembly includes a head portion, a threaded intermediate portion, and a bit portion. The threaded intermediate portion is adapted to engage the threaded inner surface of the housing. Rotation of the shaft assembly causes the bit portion to be rotated and advanced through the packing cylinder bore to remove the packing material therefrom.

6 Claims, 4 Drawing Figures

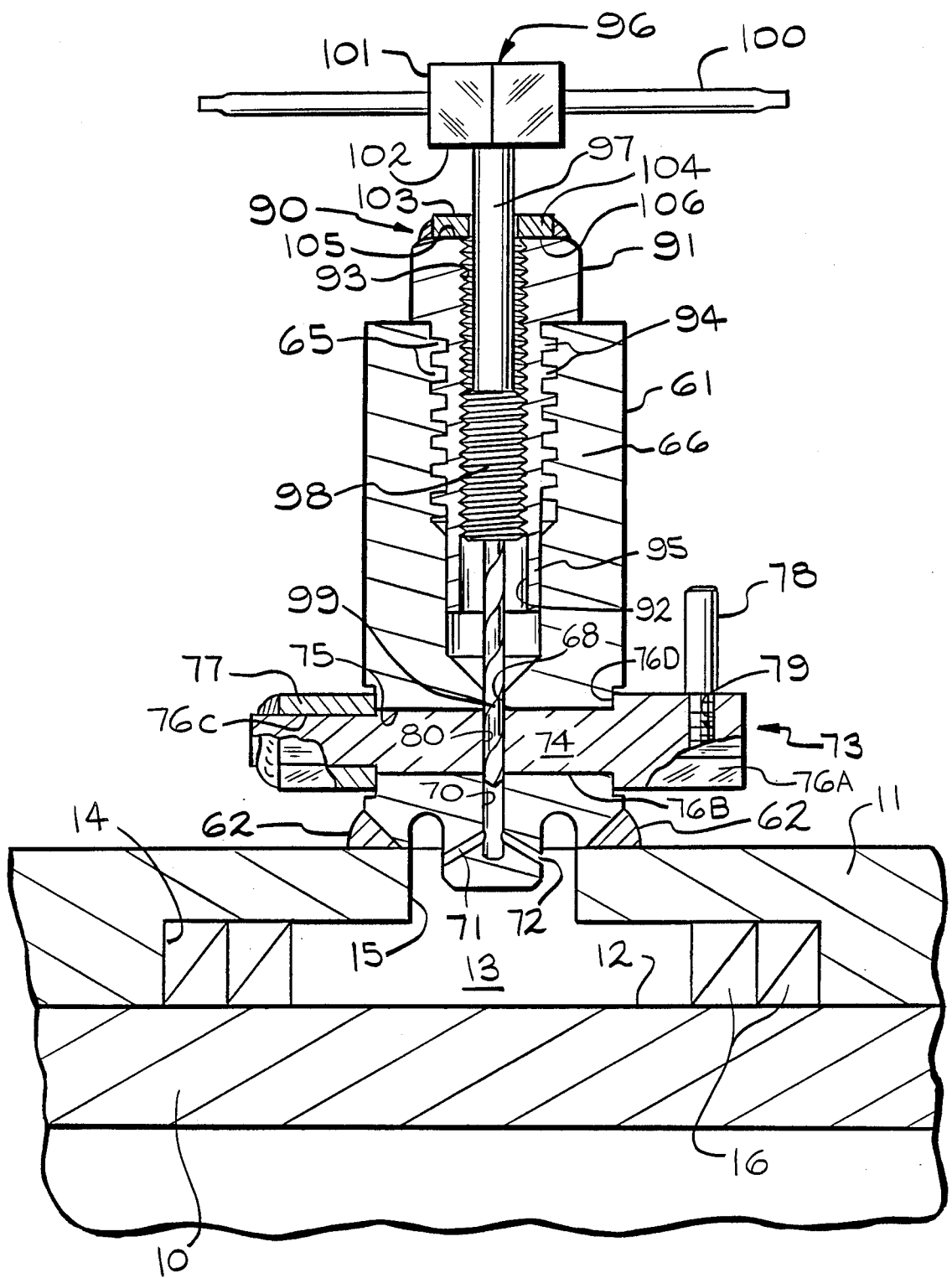

METHOD FOR REMOVING INJECTABLE MATERIAL FROM A PACKING CYLINDER

REFERENCE TO A RELATED APPLICATION

This is a continuation of U.S. patent application Ser. No. 06/719,545 filed Apr. 3, 1985, abandoned.

BACKGROUND OF THE INVENTION

1. Field of the Invention:

This invention relates to packing cylinders which are utilized to inject packing material into expansion joints, ball joints, and the like. More specifically, the invention relates to a device for removing packing material which has lost some or all of its flowable capabilities from an interior bore of such a packing cylinder to facilitate the safe injection of additional packing material through the packing cylinder and into the joint.

2. Description of the Prior Art:

Expansion joints of the type disclosed in U.S. Pat. No. 4,225,143 and ball joints are well known. Such expansion joints and ball joints are utilized to accommodate thermal expansion and contraction of conduits carrying high temperature and/or pressure fluid and having parallel and perpendicular longitudinal axes, respectively. Known expansion joints include stuffing boxes which are annular chambers formed between inner and outer telescopically arranged conduits. Known ball joints have stuffing boxes which are annular chambers formed between a ball-shaped portion of an inner conduit and a portion of a cylindrical outer conduit. Prior to service, such stuffing boxes are filled with a packing material injected therein under pressure through an internal bore of a packing cylinder so as to establish and maintain a reliable seal between the inner and outer conduits during service, notwithstanding relative movement therebetween.

The integrity of a packed expansion joint or a packed ball joint depends, in large part, upon the integrity of the seal established between the packing material in the stuffing box and the surfaces of the inner and outer conduits. In service, the packing material is subjected to extreme temperatures and pressures, either of which can compromise the integrity of the packing material seal. When the integrity of the seal is lost, it becomes necessary to add injectable packing to the stuffing box and, for economic reasons, this is preferably done while the conduits on which the expansion joint or ball joint is installed remain in service. Sometimes, such on-line packing injection can be accomplished by removing a packing plunger from the packing cylinder, inserting a plug of new packing material therein, and replacing the packing plunger so as to inject the new packing material into the stuffing box. On occasion, however, the original packing material, some of which has remained in the bore of packing cylinder, has lost some or all of its flowable capabilities to such an extent that additional packing material cannot be forced therethrough into the stuffing box without possibly damaging one or more components of the packing cylinder. In higher temperature and pressure service conditions, the problem is compounded because the packing material must be packed to a correspondingly higher density, which promotes greater loss of flowable capabilities of the packing material.

Heretofore, an operator attempting to inject additional packing material into an expansion joint or ball joint through the blocked bores of a packing cylinder could utilize several procedures. A first procedure involves simply injecting additional packing material, utilizing the method described above, in an attempt to break loose the old rigid packing material and force the new packing material into the stuffing box. It has been found that the torque which must be applied to the packing plunger under these circumstances can exceed two hundred foot-pounds. Such a large force can shear the threads formed on the packing plunger or the packing cylinder or can fracture the injection tip of the packing cylinder. Any one of these occurrences generates a dangerous situation while the joint is in service, by virtue of the possibility of blow-back of the high temperature or high pressure fluid transmitted therethrough. A second procedure involves removing the packing plunger from the packing cylinder and attempting to break out the old rigid packing material manually utilizing a sharp tool. However, when the old rigid packing material is broken out, there is a significant chance that high temperature or pressure fluid could blow-back out of the packing cylinder from the joint. This is also, obviously, a very dangerous situation. In order to avoid the problems associated with the two first procedures, a third procedure involves depressurizing the conduit piping system prior to utilizing either of the first two procedures. While safe, the third procedure is economically unsound because continuous service of the joint and conduits is essential for efficient operation of the pipeline. Because each joint includes a plurality of packing cylinders disposed thereabout, and further because each pipeline is comprised of a plurality of joints between adjacent conduits, it becomes clear that the process must be accomplished while the joint remains in service.

SUMMARY OF THE INVENTION

The instant invention is based upon the discovery of a simple but effective device which safely removes hardened packing material from an internal bore of a packing cylinder for an expansion or ball joint between the two conduits, while eliminating the need for taking the affected conduits out of service. The device, hereinafter referred to as a packing cylinder reamer, includes a housing provided with an internal longitudinal passageway extending from a first end to a second end, and further includes a bit mounted in the internal longitudinal passageway. A means is provided for rotating the bit and moving the bit longitudinally in the passageway. In operation, the packing cylinder reamer is retained in a plugged packing cylinder and the bit is rotated and advanced longitudinally towards the stuffing box. The bit is operable to loosen and remove hardened packing material from the internal bore of the packing cylinder. The packing cylinder reamer can then be removed from the packing cylinder and a plug of new packing material can be inserted into the packing cylinder. A conventional packing plunger is utilized to force the new packing material through the reamed bore of the packing cylinder and into the stuffing box. Preferably, the packing cylinder is provided with a safety valve which can be utilized to prevent the egress of high temperature or high pressure fluid from the joint when neither the packing cylinder reamer nor the packing plunger is seated in the packing cylinder.

Accordingly, it is an object of the instant invention to provide a packing cylinder reamer which is operable to safely remove hardened packing material from an internal bore of a packing cylinder for an expansion or ball joint between two conduits.

It is another object of the instant invention to facilitate the safe packing injection of a stuffing box of such an expansion or ball joint between conduits carrying fluid at a high temperature or a high pressure, while eliminating the need to take the affected conduits out of service during packing injection process.

It is a further object of the invention to provide a packing cylinder reamer which reduces the danger and costs heretofore associated with injecting packing into the stuffing box of an expansion or ball joint during service.

These and other objects of the instant invention and advantages thereof will be apparent from the following detailed description, reference being made therein to the accompanying drawings wherein like reference numerals designate like parts.

BRIEF DESCRIPTION OF THE DRAWINGS

FIG. 4 is a view, in partial section, of the expansion joint of FIG. 3, wherein a packing cylinder reamer in accordance with the instant invention has been substituted for the packing plunger.

DETAILED DESCRIPTION OF THE PREFERRED EMBODIMENTS

Figure 1:
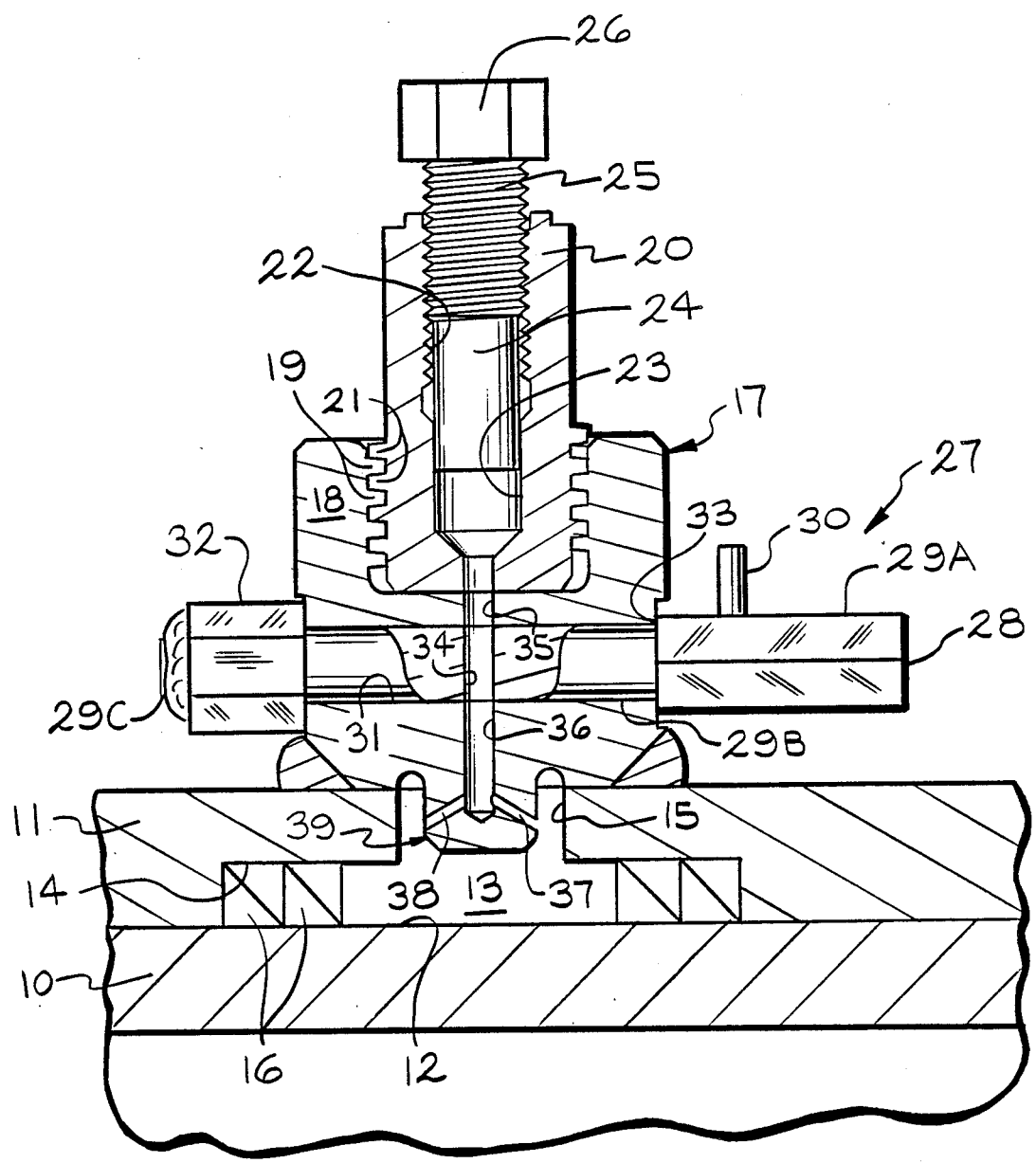
FIG. 1 is a view, in partial section, of a conventional expansion joint between two conduits adapted to carry fluids at relatively high temperatures or pressures, including a packing cylinder, an injection cylinder, and a packing plunger.

Referring in more detail to FIG. 1, there is depicted a conventional expansion joint adapted to provide a sealing connection between an inner cylindrical slip member 10 and a cylindrical outer sleeve member 11. A surface 12 on the inner cylindrical slip member 10 preferably includes a highly polished chrome plating which is extremely hard and smooth. In service, the expansion joint is positioned at a junction between a pair of conduits (not shown) in a pipeline, one end of one conduit being connected to the inner cylindrical slip member 10 and one end of the other conduit being connected to the cylindrical outer sleeve member 11 in any conventional manner. The expansion joint is adapted to join conduits carrying fluid at relatively high temperatures or pressures, typically ranging from six hundred p.s.i.g. to one thousand p.s.i.g. The cylindrical outer sleeve member 11 is configured so that it constitutes a stuffing box including a cavity 13 defined by an annular groove 14 formed in the cylindrical outer sleeve member 11. The cavity 13 is further defined by a passageway 15 which extends radially through the cylindrical outer sleeve member 11. In a conventional manner, a plurality of compressible sealing rings 16 are positioned within the cavity 13 to retain packing material (not shown) as more fully described below.

A packing cylinder 17 is provided which includes a sidewall 18 having a threaded inner surface, as shown at 19. The sidewall 18 defines a cavity within the packing cylinder 17. An injection cylinder 20 is provided with external threads 21 which are adapted to cooperate with the thread 19 of the packing cylinder 17 such that the injection cylinder 20 can be releasably secured within the cavity formed therein by rotation. The injection cylinder 20 has a hollow cylindrical cavity formed therein, including an upper threaded portion 22 and a lower smooth portion 23 which extends through the bottom end thereof. A packing plunger 24 is adapted to be selectively retained within the cavity formed in the injection cylinder 20. the packing plunger 24 includes a threaded portion 25 adapted to cooperate with the threaded portion 22 of the cavity formed in the injection cylinder 20. An enlarged headed portion 26 can be formed integral with the packing plunger 24 to facilitate rotation thereof, such as by a wrench (not shown) or other means, in installing or removing the packing plunger 24 from the injection cylinder 20.

The packing cylinder 17 is provided with a safety valve, indicated generally at 27, which comprises a stepped rod 28 defining a first terminal portion 29A having a plurality of flats which define a hexagonal cross section, a centrally disposed circular portion 29B having a first diameter and a second terminal portion 29C having a second diameter smaller than the diameter of the centrally disposed portion 29B. Affixed to the first terminal portion 29A of the rod 28, and perpendicular thereto, is an indicator 30. The centrally disposed portion 29B of the rod 28 is disposed in a transverse bore 31 formed in the packing cylinder 17. The longitudinal axis of the transverse bore 31 intersects, perpendicularly, the longitudinal axis of the packing cylinder 17. The centrally disposed portion 29B can be retained in the transverse bore 31 by a hexagonal cap 32 at one end and a shoulder 33 of the stepped rod 28 at the other. The hexagonal cap 32 may be secured to the second terminal portion 29C of the stepped rod 28 by welding or other suitable means. The hexagonal cross section of the first terminal portion 29A and of the cap 32 may be readily and, if desired, simultaneously engaged by a wrench or wrenches to rotate the stepped rod 28. In the centrally disposed portion 29B of the stepped rod 28, there is provided a rod bore 34. When the stepped rod 28 is positioned as shown in FIG. 1, the rod bore 34 is co-axially disposed with respect to the longitudinal axis of the packing cylinder 17, and the safety valve 27 is in its open position. When the safety valve 27 is in the open position, an upper cylinder bore 35 formed in the packing cylinder 17 communicates with the rod bore 34. The rod bore 34, in turn, communicates with a lower cylinder bore 36 formed in the packing cylinder 17. Both of the bores 35 and 36 are formed co-axial with the longitudinal axis of the packing cylinder 17. The upper bore 35 communicates with the lower portion 23 of the cavity formed in the injection cylinder 20. Communication between the lower bore 36 and the cavity 13 is provided through an injection slot 37 and an injection bore 38 formed in an injection tip 39 of the packing cylinder 17. When the rod 28 is rotated ninety degrees in either a clockwise or a counterclockwise direction from the position shown in FIG. 1, the longitudinal axis of the rod bore 34 will be disposed perpendicular to the longitudinal axis of the packing cylinder 17, and the safety valve 27 is in its closed position. When the safety valve 27 is in the closed position, communication is prevented between the upper and lower bores 35 and 36.

The expansion joint and the packing cylinder 17 thus far described are conventional. It will be appreciated by those skilled in the art that large expansion joints would be provided with a plurality of packing cylinders about the periphery thereof, each similar to packing cylinder 17. Each packing cylinder 17 is operable to inject packing material into the portion of the cavity 13 adjacent thereto. The packing of the expansion joint can be briefly described as follows. The safety valve 27 is initially rotated to its closed position. The injection cylinder 20 is then installed, by rotation, into the packing cylinder 17. A packing plug is inserted into the lower portion 23 of the cavity formed in the injection cylinder 20. The packing plug can have any suitable packing material composition, such as graphite or a blend of fibrous asbestos and polytetrafluoroethylene. The packing plunger 24 is then threaded into the injection cylinder 20 to seal the cavity formed therein so that the safety valve 27 can be moved to the open position. After the safety valve 27 is so moved, the packing plunger 24 is further rotated to move it downwardly toward the joint, thereby forcing the packing material into and through the bores 35, 34, 36, and 38 and the slot 37 into the cavity 13. The safety valve 27 is then rotated to its closed position and the foregoing procedure is repeated until a sufficient amount of packing material has been injected into the cavity 13. The entire procedure is repeated for each packing cylinder 17 about the expansion joint until the cavity 13 contains enough packing material at an appropriate density for the particular application. Finally, the injection cylinder 20 can be removed from the packing cylinder 17 (while the safety valve is in its closed position) and a short threaded sealing plug (not shown) can be threaded in its place to insure that no fluid escapes therethrough and keep out foreign debris.

As is well known to those skilled in the art, the service conditions encountered by an expansion joint can range from moderate to extremely severe. Inevitably, there comes a time in the service life of an expansion joint when a leak occurs and additional packing material must be forced into the cavity 13. This task can be complicated by the presence of packing material in the bores 34, 35, 36, and 38 and the slot 37, which packing material has become very rigid due to its highly compressed state and the temperature extremes encountered under service conditions.

Figure 2:
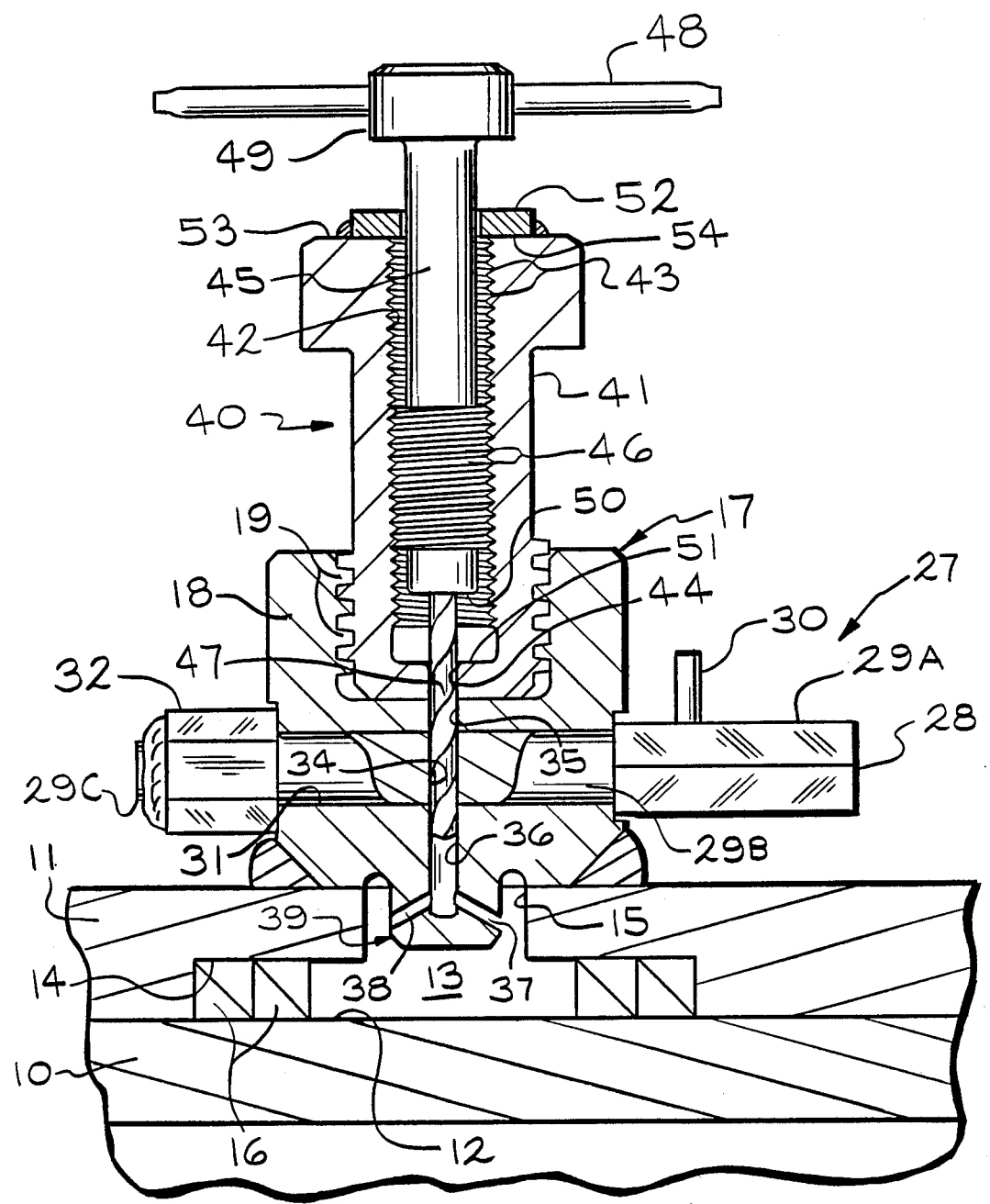
FIG. 2 is a view, in partial section, of the expansion joint of FIG. 1, wherein a packing cylinder reamer in accordance with the instant invention has been substituted for the injection cylinder and the packing plunger.

Referring now in more detail to FIG. 2, a packing cylinder reamer in accordance with the instant invention is indicated generally at 40. The packing cylinder reamer 40 comprises a housing 41 having a co-axial bore 42 formed therein which extends longitudinally throughout. The bore 42 is internally threaded, as indicated at 43, and has a reduced diameter portion 44 at its lower end. Within the bore 42, there is disposed a shaft assembly 45, an intermediate portion 46 of which is externally threaded. The threaded intermediate portion 46 is adapted to engage the internal threads 43 formed on the bore 42. A bit 47 is formed integral with the intermediate portion 46 of the shaft assembly 45 co-axial with the longitudinal axis thereof. A handle 48 is mounted on an enlarged head portion 49 of the shaft assembly 45. Rotation of the handle 48 causes rotation of the entire shaft assembly 45 and imparts movement thereto along the longitudinal axis of the housing 41. When the handle 48 is rotated in one direction, the bit 47 is moved downwardly through the bores 35, 34, and 36 to an extended position (not shown), wherein a bottom surface 50 of the shaft assembly 45 abuts against the surface of an end wall 51 of the coaxial bore 42. At this time, the bit 47 is extended into the second cylinder bore 36.

When the handle 48 is rotated in the opposite direction, the bit 47 is moved upwardly to a retracted position (not shown), wherein the bottom surface 50 of the shaft assembly 45 is spaced apart from the end wall 51 of of the co-axial bore 42, and the bit 47 is retracted within the co-axial bore 42 of the housing 41. A split washer 52 is preferably welded to a top surface 53 of the housing 41. When the bit 47 is retracted within the bore 42 of the housing 41, the top of the threaded intermediate portion 46 of the shaft assembly 45 abuts a bottom surface 54 of the split washer 52 to prevent disengagement of the shaft assembly 45 from the housing 41. Such a structure permits containment of the high temperature and/or high pressure fluid in the event of blow-back before the safety valve 27 is rotated to its closed position. The top surface 53 of the housing 41 can be shaped in the form of a hexagon to facilitate its rotation, by a wrench (not shown) or any other means, for securing the packing cylinder reamer 40 in the packing cylinder 17 and removing it therefrom.

The packing cylinder reamer 40 of the instant invention provides a simple, safe, and expeditious solution to the above-described problems associated with the injection of additional packing material into the stuffing box while the expansion joint is in service. The use of the packing cylinder reamer 40 to remove rigid additional packing material will now be described with reference to FIGS. 1 and 2. The safety valve 27 is initially rotated to its closed position. The injection cylinder 20 is then removed from the packing cylinder 17, for example, by engaging flats formed thereon with a wrench and rotating the injection cylinder 20. The packing cylinder reamer 40, with its bit 47 in the retracted position, is next threaded into the packing cylinder 17. Once the reamer 40 has been threaded into the packing cylinder 17, the safety valve 27 can be rotated to its open position. Once the safety valve 27 is in its open position, shaft assembly 45 is rotated in one direction to advance the bit 47 downwardly through the upper cylinder bore 35 and the rod bore 34 into the lower cylinder bore 36. The shaft assembly 45 is rotated until the bottom surface 50 of the shaft assembly 45 abuts the surface of the end wall 51. In this extended position, the bit 47 is positioned in the lower cylinder bore 36 past the injection slot 37 and the injection bore 38, but not yet contacting the injection tip 39. As the bit 47 is advanced, it loosens and removes rigid packing material from each of the bores 35, 34, and 36. The shaft assembly 45 can then be rotated in the opposite direction to move the bit 47 to its retracted position, at which time the top of the threaded intermediate portion 46 abuts the bottom surface 54 of the split washer 52 to prevent disengagement of the shaft assembly 45 from the housing 41. At this point, the safety valve 27 is rotated to its closed position and the packing cylinder reamer 40 is removed from the cavity formed in the packing cylinder 17. The injection cylinder 20 and the packing plunger 24 can then be utilized to inject additional packing material into the cavity 13 of the stuffing box as described above. For maximum safety, the safety valve 27 should always be kept in its closed position, except when additional packing plugs are being injected into the cavity 13 of the stuffing box or when the bit 47 is advanced therethrough. It should be emphasized that, at all times during this procedure, the safety valve 27, the packing plunger 24 or the packing cylinder reamer 40 or a combination thereof, prevent blow-back through the packing cylinder 17 of high pressure or temperature fluid.

As mentioned above, the torque which must be applied to the packing plunger 24 in order to break through hardened packing material in the packing cylinder 17 frequently exceeds two hundred foot-pounds. By utilizing the packing cylinder reamer 40 in accordance with the instant invention, however, it has been found that that torque requirement has been consistently reduced to less than one hundred foot-pounds. Thus, there is no danger of damaging any of the components of the packing cylinder 17 by the application of excessive force. Furthermore, the packing cylinder reamer 40 according to the instant invention drastically reduces the dangers heretofore associated with the injection of additional packing material into an expansion joint. Since the packing cylinder 17 is sealed by the reamer 40 during use, the chances of injury resulting from unexpected leakage of high temperature or pressure fluid are greatly reduced.

Figure 3:
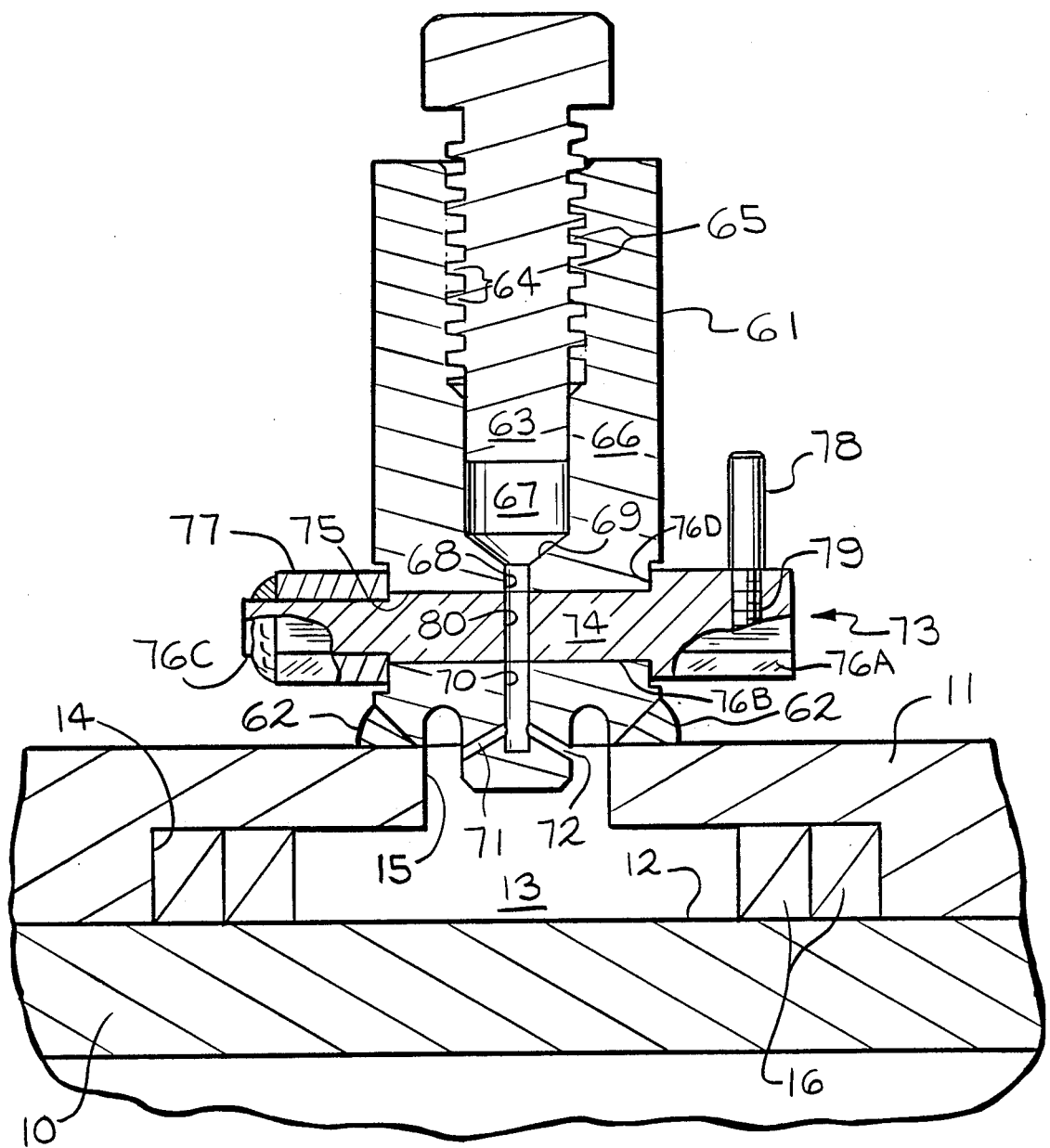
FIG. 3 is a view, in partial section, of a conventional expansion joint between two conduits adapted to carry fluids at relatively lower temperatures or pressures, including a packing cylinder and packing plunger.

With reference to FIGS. 3 and 4, there is depicted an alternate expansion joint which is quite similar to the expansion joint described above. The alternate expansion joint is adapted to join conduits carrying fluid at relatively lower temperatures and pressures, typically ranging from three hundred p.s.i.g. to six hundred p.s.i.g. The alternate joint is provided with a stuffing box corresponding with that shown in FIGS. 1 and 2. The stuffing box includes an inner cylindrical slip member 10, an outer sleeve member 11, and a hard polished chrome surface 12 formed on the inner cylindrical slip member 10. The stuffing box further comprises a cavity 13 defined by a groove 14 in the outer sleeve member 11. A passageway 15 extends radially through the outer sleeve member 11 from the cavity 13. A plurality of sealing rings 16 are positioned within the cavity 13 to retain packing material (not shown) therein. A packing cylinder 61 is welded, as indicated at 62, to the outer sleeve member 11 around the passageway 15 therein. A packing injector 63, provided with external threads 64, can be engaged with corresponding internal threads 65 provided on a sidewall 66 of the packing cylinder 61. The sidewall 66 defines a cavity 67 which is in communication with an upper cylinder bore 68 through a tapered portion 69 of the cavity 67. A lower cylinder bore 70 in the packing cylinder 61 communicates with an injection bore 71 and an injection slot 72, both of which, in turn, communicate with the cavity 13 of the stuffing box. The upper and lower cylinder bores 68 and 70 are co-axial with the packing cylinder 61 and the cavity 67.

The packing cylinder 61 is provided with a safety valve, indicated generally at 73, which comprises a stepped rod 74 extending through a transverse bore 75 formed in the packing cylinder 61. The stepped rod 74 defines a first terminal portion 76A having a plurality of flats which define a hexagonal cross section, a centrally disposed circular portion 76B having a first diameter and a second terminal portion 76C having a second diameter smaller than the diameter of the centrally disposed portion 76B. The centrally disposed portion 76B of the stepped rod 74 may be retained in the transverse bore 76 by a hexagonal cap 77 disposed at one end and a shoulder 76D at the other. The hexagonal cap 77 may be secured to the second terminal portion 76C of the stepped rod 74 by welding or other suitable means. The hexagonal cross section of the first terminal portion 76A and of the hexagonal cap 77 may be readily and, if desired, simultaneously engaged by a wrench or wrenches to rotate the stepped rod 74. A pointer 78 is secured in an aperture 79 of the rod 74 and is perpendicular thereto to indicate open or closed position of the safety valve 73. A rod bore 80 is provided through the rod 74. When the safety valve 73 is in its open position, as shown in FIG. 3., the rod bore 80 is co-axially aligned so as to provide communication between the bores 68 and 70 in the packing cylinder 61. When the stepped rod 74 is rotated ninety degrees in either direction from the position shown in FIG. 3, the safety valve 73 is moved to its closed position, thereby preventing communication between the bores 68 and 70 of the packing cylinder 61.

Referring now to FIG. 4, there is shown a second embodiment of a packing cylinder reamer 90 in accordance with the instant invention. The packing cylinder reamer 90 includes a housing 91 which is provided with an internal bore 92, a portion of which is internally threaded as at 93. A portion of the housing 91 is externally threaded, as at 94, to engage the corresponding internal threads 65 formed on the wall 66 of the packing cylinder 61. A lower cylindrical portion 95 of the housing 91 is neither internally nor externally threaded. A shaft assembly 96 is mounted in the bore 92 of the housing 91. The shaft assembly 96 comprises a shaft 97, a portion of which is threaded as at 98, and a bit 99 which is secured thereto. Rotation of the shaft assembly 96, as by rotation of a handle 100 secured to a hexagonally-shaped head portion 101 of the shaft 97, imparts rotation and longitudinal movement of the bit 99, as described above. When the shaft assembly 96 is rotated in one direction to a position (not shown) where a bottom surface 102 of the hexagonally-shaped head portion 101 abuts a top surface 103 of a split washer 104 which is welded to an upper surface 105 of the housing 91, the bit 99 is in its extended position. When the shaft assembly 96 is rotated in the opposite direction, the bit 99 is moved from its extended position to a retracted position, wherein all of the bit 99 is within the bore 92 in the housing 91 and the top of the threaded intermediate portion 98 abuts a bottom surface 105 of the split washer 104 to prevent disengagement of the shaft assembly 96 from the housing 91. The packing cylinder reamer 90 is utilized to loosen and remove packing material from the bores 68, 80 and 70, in a manner which is substantially as described above for packing cylinder reamer 40 with reference to FIGS. 1 and 2.

The packing cylinder reamer 90 can be used safely with packing cylinders 61 not equipped with safety valves 73 if due care is exercised when removing the packing cylinder reamer 90 therefrom. The packing cylinder reamer 90 should be removed very slowly while an operator checks for blow-back of fluid from the joint. At the first sign of such flow, the packing cylinder reamer 90 should be reseated in the packing cylinder 61 and adjacent packing cylinders should be utilized to inject additional packing material into the stuffing box of the affected expansion joint. In most cases, the injection of additional packing material through adjacent packing cylinders on the affected expansion joint will eliminate reverse flow through the affected packing cylinder 61 when the packing cylinder reamer 90 is subsequently removed therefrom.

It will be readily appreciated by those skilled in the art that the instant invention can be utilized readily to loosen and remove hardened packing material from a packing cylinder welded to a ball joint with a similar reduction in torque requirement and a similar increase in safety. The foregoing embodiments of the instant invention constitute the best modes presently known to the inventors. The foregoing description of the preferred embodiments is intended merely to illustrate but not limit the scope of the instant invention which is defined in the following claims.

We claim:

1. A method for injecting packing material through a packing cylinder provides with a cavity at least partially defined by an internally threaded wall, a plunger provided with corresponding external threads, and a bore extending along the longitudinal axis of the packing cylinder towards an injection tip, said method comprising the steps of:

rotating said plunger to disengage it from the packing cylinder and checking for any sign of blow-back during disengagement, during disengagement of the plunger, upon any sign of blow-back, rotating the plunger to reengage it with the packing cylinder and injecting packing material through at least one adjacent packing cylinder and repeating the method beginning with the step of rotating the plunger to disengage it, rotating a reamer device to engage corresponding external threads provided thereon with those in the packing cylinder cavity, said reamer device including a shaft assembly provided with a bit and means mounting the shaft assembly in said reamer for selectively advancing and withdrawing said bit in the packing cylinder bore to remove packing material therefrom, advancing said bit to remove packing material from the bore of the packing cylinder, withdrawing said bit from the bore of the packing cylinder, disengaging the reamer device from the packing cylinder cavity and checking for any sign of blow-back, during disengagement of the reamer device, upon any sign of blow-back, rotating the reamer device to reengage it in the packing cylinder cavity and injecting packing material through at least one adjacent packing cylinder and repeating the preceding step, inserting packing material into the cavity of the packing cylinder, partially engaging said plunger in the packing cylinder cavity, applying up to a given amount of torque to rotate said plunger to force the packing material through said bore, during rotation of the plunger, upon the given amount of torque being exceeded, repeating the method beginning with the step of rotating the plunger to disengage it.

2. A method for injecting packing material through a packing cylinder provided with a cavity at least partially defined by an internally threaded wall, a plunger provided with corresponding external threads, a bore extending along the longitudinal axis of the packing cylinder and terminating in an injection tip and at least one non-axial aperture providing communication between the termination of the bore and the exterior of the injection tip, said method comprising the steps of:

rotating said plunger to disengage it from the packing cylinder and checking for any sign of blow-back during disengagement, during disengagement of the plunger, upon any sign of blow-back, rotating the plunger to reengage it with the packing cylinder and injecting packing material through at least one adjacent packing cylinder and repeating the method beginning with the step of rotating the plunger to disengage it, rotating a reamer device to engage corresponding external threads provided thereon with those in the packing cylinder cavity, said reamer device including a shaft assembly provided with a bit and means mounting the shaft assembly in said reamer for selectively advancing and withdrawing said bit through the packing cylinder bore to remove packing material therefrom, advancing said bit to remove packing material from the bore of the packing cylinder, withdrawing said bit from the bore of the packing cylinder, disengaging the reamer device from the packing cylinder cavity while checking for any sign of blow-back, during disengagement of the reamer device, upon any sign of blow-back, rotating the reamer device to reengage it in the packing cylinder cavity and injecting packing material through at least one adjacent packing cylinder and repeating the preceding step, inserting packing material into the cavity of the packing cylinder, partially engaging said plunger in the packing cylinder cavity, applying up to a given amount of torque to rotate said plunger to force the packing material through the aperture, during rotaton of the plunger, upon the given amount of torque being exceeded, repeating the method beginning with the step of rotating the plunger to disengage it.

3. The method as claimed in claim 2 wherein the reamer device is provided with stop means for preventing the advancement of the bit beyond the termination of said bore.

4. A method for injecting packing material through a packing cylinder provided with a cavity at least partially defined by an internally threaded wall, a plunger provided with corresponding external threads, a bore extending along the longitudinal axis of the packing cylinder and terminating in an injection tip, at least one non-axial aperture providing communication between the termination of the bore and the exterior of the injection tip and valve means operable in a closed position and inoperable in an open position to seal the bore, said method comprising the steps of:

closing the valve means if open, rotating the plunger to disengage it from the packing cylnder and checking for any sign of blow-back during disengagement, during disengagement of the plunger, upon any sign of blow-back, rotating the plunger to reengage it with the packing cylinder and injecting packing material through at least one adjacent packing cylinder and repeating the method beginning with the step of rotating the plunger to disengage it, rotating a reamer device to engage corresponding external threads provided thereon with those in the packing cylinder cavity, said reamer device including a shaft assembly provide with a bit and means mounting the shaft assembly in said reamer for selectively advancing and withdrawing said bit through the packing cylinder bore to remove packing material therefrom, opening the valve means, advancing said bit to remove packing material from the bore of the packing cylinder, withdrawing said bit from the bore of the packing cylinder, closing the valve means, disengaging the reamer device from the packing cylinder cavity while checking for any sign of blow-back, during disengagement of the reamer device, upon any sign of blow-back, rotating the reamer device to reengage it in the packing cylinder cavity and injecting packing material through at least one adjacent packing cylinder and repeating the preceding step, inserting packing material into the cavity of the packing cylinder, partially engaging said plunger in the packing cylinder cavity, opening the valve means, applying up to a given amount of torque to rotate said plunger to force the packing material through the aperture, during rotation of the plunger, upon the given amount of torque being exceeded, repeating the method beginning with the step of closing the valve means, and closing the valve means.

5. The method as claimed in claim 4 wherein the reamer device is provided with stop means for preventing advancement of the bit beyond the termination of the bore.

6. A method for injecting packing material through a packing cylinder provided with a cavity at least partially defined by an internally threaded wall, a plunger provided with corresponding external threads, a bore extending along the longitudinal axis of the packing cylinder and terminating in an injection tip and valve means operable in a closed position and inoperable in an open position to seal the bore, said method comprising the steps of:

closing the valve means if open, rotating the plunger to disengage it from the packing cylinder and checking for any sign of blow-back during disengagement, during disengagement of the plunger, upon any sign of blow-back, rotating the plunger to reengage it with the packing cylinder and injecting packing material through at least one adjacent packing cylinder and repeating the method beginning with the step of rotating the plunger to disengage it, rotating a reamer device to engage corresponding external threads provided thereon with those in the packing cylinder cavity, said reamer device including a shaft assembly provided with a bit and means mounting the shaft assembly in said reamer for selectively advancing and withdrawing said bit through the packing cylinder bore to remove packing material therefrom, opening the valve means, advancing said bit to remove packing material from the bore of the packing cylinder, withdrawing said bit from the bore of the packing cylinder, closing the valve means, disengaging the reamer device from the packing cylinder cavity while checking for any sign of blow-back, during disengagement of the reamer device, upon any sign of blow-back, rotating the reamer device to reengage it in the packing cylinder cavity and injecting packing material through at least one adjacent packing cylinder and repeating the preceding step, inserting packing material into the cavity of the packing cylinder, partially engaging said plunger in the packing cylinder cavity, opening the valve means, applying up to a given amount of torque to rotate said plunger to force the packing material through the bore, during rotation of the plunger, upon the given amount of torque being exceeded, repeating the method beginning with the step of closing the valve means, and closing the valve means.

* * * * *